United States Patent
Morris et al.

(10) Patent No.: US 10,460,653 B2
(45) Date of Patent: Oct. 29, 2019

(54) SUBPIXEL WEAR COMPENSATION FOR GRAPHICAL DISPLAYS

(71) Applicant: Microsoft Technology Licensing, LLC, Redmond, WA (US)

(72) Inventors: Matthew Morris, Seattle, WA (US); Ying Zheng, Sammamish, WA (US); Minhyuk Choi, Sammamish, WA (US); Rajesh Manohar Dighde, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 214 days.

(21) Appl. No.: 15/606,768

(22) Filed: May 26, 2017

(65) Prior Publication Data

US 2018/0342200 A1    Nov. 29, 2018

(51) Int. Cl.
*G09G 3/3208*     (2016.01)
*H04N 17/00*      (2006.01)
(Continued)

(52) U.S. Cl.
CPC ......... *G09G 3/3208* (2013.01); *G06F 3/1407* (2013.01); *G06T 1/60* (2013.01); *G09G 3/2003* (2013.01); *G09G 3/2092* (2013.01); *H04N 17/004* (2013.01); *G01J 2003/467* (2013.01); *G09G 5/02* (2013.01); *G09G 2320/0233* (2013.01); *G09G 2320/0242* (2013.01);
(Continued)

(58) Field of Classification Search
None
See application file for complete search history.

(56) References Cited

U.S. PATENT DOCUMENTS 8,018,476 B2    9/2011   Credelle et al.
8,189,016 B2    5/2012   Higgins et al.
(Continued)

FOREIGN PATENT DOCUMENTS

WO    2014143484 A1    9/2014
WO    2016209344 A1    12/2016

OTHER PUBLICATIONS

"International Search Report and Written Opinion Issued in PCT Application No. PCT/US2018/029671", dated Sep. 17, 2018, 21 Pages.
(Continued)

*Primary Examiner* — Joseph R Haley
*Assistant Examiner* — Emily J Frank
(74) *Attorney, Agent, or Firm* — Alleman Hall Creasman & Tuttle LLP

(57) ABSTRACT

A graphical display device includes a plurality of color-specific subpixels spatially distributed across a display region. Subpixel wear compensation is performed for some or all of the color-specific subpixels. For each color-specific subpixel, the compensation may include sampling one or more display signals directed to the color-specific subpixel to obtain a time-series of sampled values. The compensation may further include storing, in non-volatile storage, compensation data for the color-specific subpixel derived from the time-series of sampled values. The compensation may further include driving the color-specific subpixel based on the compensation data.

20 Claims, 5 Drawing Sheets

(51) Int. Cl.
  *G06T 1/60* (2006.01)
  *G09G 3/20* (2006.01)
  *G06F 3/14* (2006.01)
  *G01J 3/46* (2006.01)
  *H04N 1/00* (2006.01)
  *G09G 5/02* (2006.01)

(52) U.S. Cl.
  CPC ........... *G09G 2320/0295* (2013.01); *G09G 2320/043* (2013.01); *G09G 2320/046* (2013.01); *G09G 2320/048* (2013.01); *H04N 1/00045* (2013.01)

(56) References Cited

U.S. PATENT DOCUMENTS

| | | | |
|---|---|---|---|
| 8,378,947 B2 | 2/2013 | Im et al. | |
| 9,117,400 B2 | 8/2015 | Chaji et al. | |
| 9,355,601 B2 | 5/2016 | Brown Elliott | |
| 9,478,156 B2 | 10/2016 | Jeong et al. | |
| 2011/0285713 A1 | 11/2011 | Swic et al. | |
| 2012/0229526 A1 | 9/2012 | Holmes et al. | |
| 2014/0085170 A1* | 3/2014 | Park | G09G 5/02 345/83 |
| 2014/0176617 A1* | 6/2014 | Jeong | G09G 3/2003 345/690 |
| 2017/0004765 A1 | 1/2017 | Tani et al. | |
| 2017/0124947 A1 | 5/2017 | Kim et al. | |

OTHER PUBLICATIONS

Kalali, et al., "A Low Energy Hevc Sub-Pixel Interpolation Hardware", In Proceedings of IEEE International Conference on Image Processing, Oct. 27, 2014, pp. 1218-1222.

"Invitation to Pay Additional Fees Issued in PCT Application No. PCT/US2018029671", dated Jul. 20, 2018, 4 Pages.

* cited by examiner

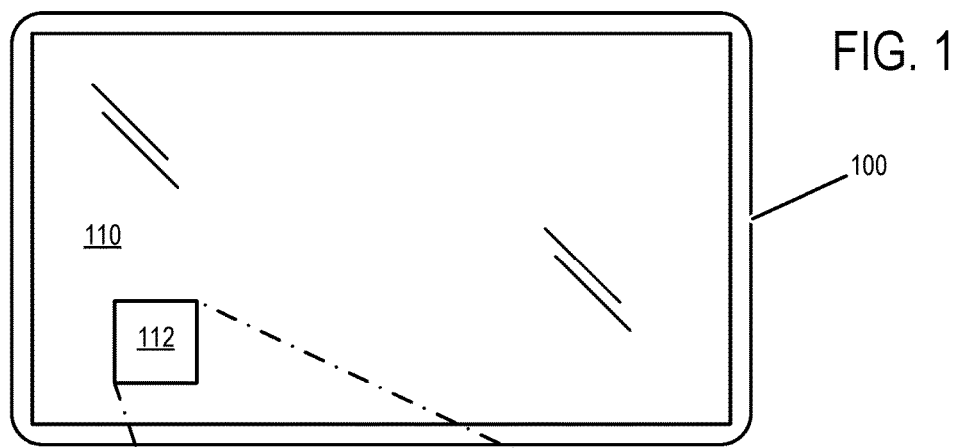
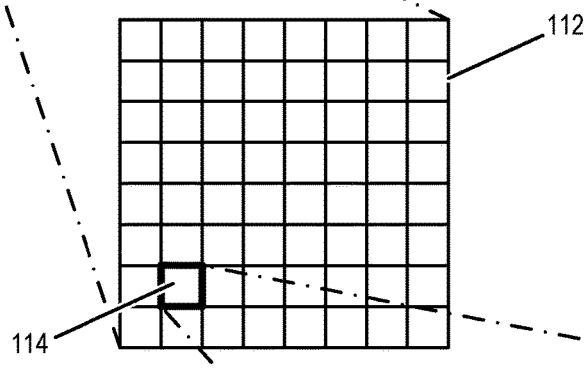
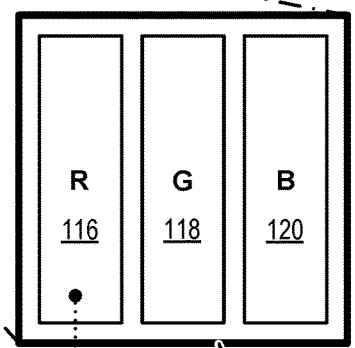
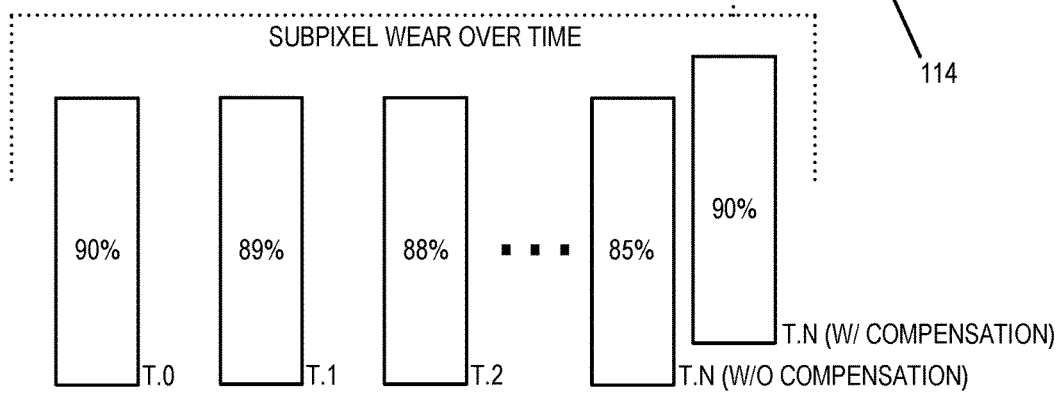
FIG. 1

SUBPIXEL WEAR COMPENSATION FOR GRAPHICAL DISPLAYS

BACKGROUND

Graphical display devices include a display region formed from a collection of pixels. For some graphical display devices, each pixel may include two or more individually addressable subpixels. Each subpixel of these multiple subpixel configurations produce light within a limited wavelength or wavelength range that differs from the light produced by other subpixels of the same pixel. For example, each pixel of a graphical display device may include red, green, and blue light generating subpixels.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A graphical display device includes a plurality of color-specific subpixels spatially distributed across a display region. Subpixel wear compensation is performed for some or all of the color-specific subpixels. For each color-specific subpixel, the compensation may include sampling one or more display signals directed to the color-specific subpixel to obtain a time-series of sampled values. The compensation may further include storing, in non-volatile storage, compensation data for the color-specific subpixel derived from the time-series of sampled values. The compensation may further include driving the color-specific subpixel based on the compensation data.

BRIEF DESCRIPTION OF THE DRAWINGS

FIG. 1 is a schematic diagram depicting features of an example graphical display device.

DETAILED DESCRIPTION

Figure 2:
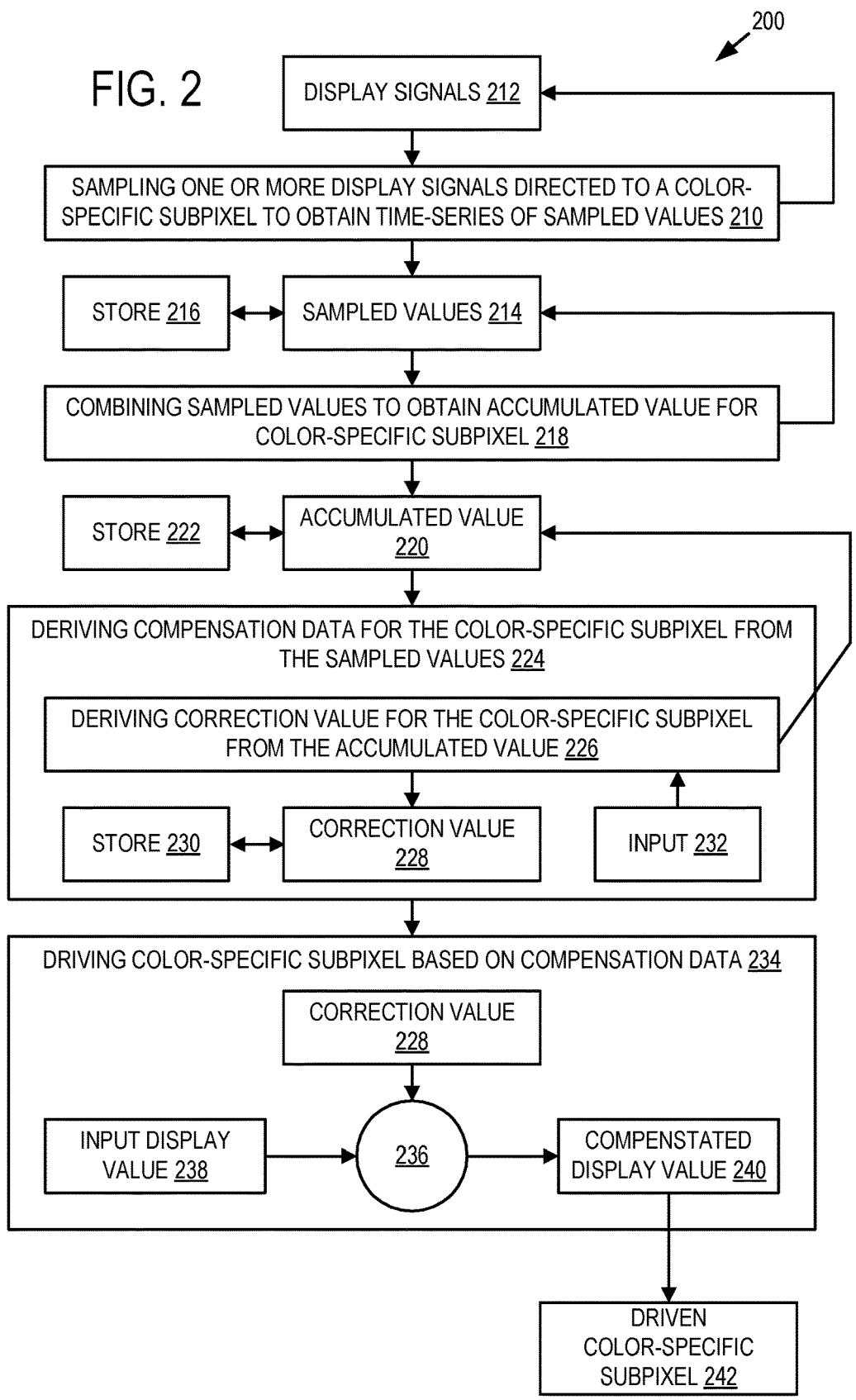
FIG. 2 is a flow diagram depicting an example method of compensating for subpixel wear in a graphical display device.

The subject matter of the present disclosure is directed to compensating for wear on a per subpixel basis within a graphical display device. The disclosed wear compensation techniques may be used to digitally correct for a reduction in luminance per sub-pixel on a color-by-color basis that may otherwise adversely affect the perceived brightness and uniformity of the display. Without such compensation, for example, a uniformity of the display, in terms of luminance and color, may be reduced over time due to differences in use and wear characteristics among color-specific subpixels. The disclosed wear compensation techniques may be implemented at pixel clock rate in a timing controller of a graphical display device, as a non-limiting example. The disclosed techniques further enable relatively slower updates to accumulated subpixel wear (e.g., at a host computing device).

FIG. 1 is a schematic diagram depicting features of an example graphical display device 100. Graphical display device 100 includes a display region 110 including a plurality of pixels that are spatially distributed across display region 110. For example, display region 110 may include a geometric array of thousands, millions, or more pixels. Graphical display device 100 may take the form of an LED or OLED display, as non-limiting examples.

A sub-region 112 of display region 110 is expanded within FIG. 1 to depict additional details, including individual pixel 114 arranged among a plurality of neighboring pixels of the sub-region. Pixel 114 is also further expanded within FIG. 1 to depict additional details, including a plurality of subpixels of pixel 114. The term "subpixel" refers to an individually addressable subunit of a pixel. A pixel may include a set of two or more color-specific subpixels in which each color-specific subpixel of the pixel generates light within a limited wavelength or wavelength range that differs from the light generated by at least one other color-specific subpixel of the set.

As depicted in FIG. 1, pixel 114 includes three color-specific subpixels in which a first subpixel 116 corresponds to a red subpixel, a second subpixel 118 corresponds to a green subpixel, and third subpixel 120 corresponds to a blue subpixel. It will be understood that a pixel may include any suitable quantity of color-specific subpixels that support two, three, four, five, or more different wavelengths or wavelength ranges of illumination. Within this context, the term "color" may refer to electromagnetic radiation within the human-visible wavelength range including white light, as well as infrared and other near-visible wavelength ranges (e.g., ultra-violet). In some implementations, two or more subpixels may support the same color (e.g., a pixel may include two green subpixels). Each pixel of display region 110 may include the same quantity and/or geometric arrangement of color-specific subpixels. Accordingly, graphical display device 110 may include a plurality of color-specific subpixels of two or more different wavelengths or wavelength ranges that are spatially distributed across display region 110 of the graphical display device.

Over time, as a subpixel is driven to generate light and thereby illuminate the display region, the subpixel may experience wear in the form of reduced luminance output by the subpixel per unit power input to the subpixel. A magnitude of subpixel wear may be dependent upon a magnitude of power input to the subpixel and a duration of that power input. For example, a subpixel will typically experience greater wear over a given period of time if the subpixel is driven by a greater power input to provide a higher level of illumination as compared to a lower power input providing a lower level of illumination. Accordingly, a magnitude of subpixel wear may be characterized by the integral of a function that describes a relationship between time and power input to the subpixel.

FIG. 1 further depicts a non-limiting example of subpixel wear over time for example subpixel 116. At an initial time (T.0), subpixel 116 is driven at a given power input that corresponds to 90% of its initial maximum luminance. As time progresses over which subpixel 116 is driven to provide illumination that is either constant or variable (as visually depicted from time T.0 to T.1 to T.2 to T.N, etc.), the subpixel's luminance is gradually reduced when driven by the same power input. For example, at time T.1, subpixel 116 provides only 89% of its original maximum luminance as compared to the initial 90% for the same power input. At T.2, subpixel 116 provides only 88% of its original maximum luminance as compared to the initial 90% for the same power input. At time T.N, subpixel 116 provides only 85% of its original maximum luminance as compared to the initial 90% for the same power input.

Subpixel wear may further be color-dependent. For example, color-specific subpixel 116 corresponding to a first wavelength or wavelength range may exhibit a different rate of subpixel wear in terms of a reduction in luminance for a given power input as compared to color-specific subpixels 118 or 120 corresponding to different wavelength or wavelength ranges. Therefore, over time, a graphical display device that includes a plurality of color-dependent subpixels of two or more different wavelengths or wavelength ranges may exhibit variation in luminance and/or color across the display region.

In some scenarios, the appearance of subpixel wear in the form of reduced luminance per power input may be reduced or eliminated by compensating for subpixel wear on a color-by-color basis through adjustment of the input power driving the subpixels. For example, a power input to subpixel 116 at time T.N may be adjusted to increase the luminance of the subpixel to or towards the original luminance value of 90%, thereby reducing variations in luminance and/or color across the display region that may otherwise develop over time.

However, in some scenarios, fully compensating for subpixel wear across a display region of pixels may not be possible or may be undesirable. Accordingly, the appearance of subpixel wear may be reduced by scaling a level of compensation applied to power input to the subpixels over the display region to provide a more uniform luminance and/or to reduce color variation across the display region that may otherwise develop over time.

FIG. 2 is a flow diagram depicting an example method 200 of compensating for subpixel wear in a graphical display device. Method 200 may be performed in connection with a graphical display device having a plurality of color-specific subpixels that are spatially distributed across a display region of the graphical display device. For example, method 200 may be performed in connection with graphical display device 100 of FIG. 1 to compensate for subpixel wear.

Method 200 or portions thereof may be performed by a variety of different computing platforms depending on implementation. As non-limiting examples, method 200 may be performed entirely by a computing platform of the graphical display device in a display-based implementation, entirely by a computing platform of the host computing device connected to the graphical display device in a host-based implementation, or collectively by the graphical display device and the host computing device in a localized distributed implementation. As another non-limiting example, method 200 may be performed by a computing platform of a remote computing device (e.g., a network service) connected to the graphical display device or a host computing device via a communications network in a network-based implementation, or may be collectively performed by computing platforms of the remote computing device and the graphical display device and/or host computing device in a highly distributed network-based implementation.

Method 200 is described with reference to an individual color-specific subpixel of a graphical display device. Furthermore, method 200 or portions thereof may be performed for each color-specific subpixel of a subset of the plurality of color-specific subpixels of the graphical display device. This subset may refer to all or fewer than all subpixels of a particular color (e.g., wavelength or wavelength range), for example. In an example, method 200 or portions thereof may be performed for each and every color-specific subpixel of the graphical display device on a color-by-color basis. Accordingly, in a more comprehensive implementation, method 200 may be performed for each and every subpixel of the graphical display device, whereas in a less comprehensive implementation, method 200 may be performed for only some of the subpixels of the graphical display device.

For the color-specific subpixel, at 210, the method includes sampling one or more display signals 212 directed to the color-specific subpixel to obtain a time-series of sampled values 214. Each sampled value of the time-series of sampled values 214 may correspond to a display value of the display signal at which the color-specific subpixel is driven to provide illumination. Each sampled value of the time-series of sampled values 214 may have a magnitude that is associated with an identifier (e.g., address) of the color-specific subpixel. Display signals 212 may correspond to uncompensated or compensated display signals that are actually used to drive the color-specific subpixel. These display signals define a power input to the color-specific subpixel, which in turn defines a luminance of the color-specific subpixel. In at least some implementations, the graphical display device may communicate the display value or information describing the display signal driving the color-specific subpixel to a host computing device for sampling and/or accumulation of sampled values.

Sampling display signals 212 may be performed across multiple sessions of the graphical display device. As an example, display signals 212 may be sampled over each and every session of the graphical display device from its inception so that sampled values 214 provide a historical record of use of the color-specific subpixel over the entire lifespan of the graphical display device. Sampling of display signals 212 may be performed at predetermined sampling intervals, which may be time and/or display frame dependent (every frame, once per 10 frames, once per second, once per minute, once per hour, etc.), or at random sampling intervals depending on implementation.

At 216, the method includes storing the sampled values 214 in computer-readable storage, which may take the form of non-volatile storage or volatile storage of the graphical display device, a host computing device connected to the graphical display device, or a remote computing device connected to the graphical display device or host computing device via a communications network. Volatile storage may be used, for example, within implementations where a computing platform of the graphical display device or a host computing device retains the sampled values during runtime. By contrast, non-volatile storage may be used to persistently retain the sampled values, even across multiple sessions involving start-up and shutdown of the computing platform, for example. In at least some implementations, a computing platform (e.g., of the graphical display device or host computing device) may store the sampled values in non-volatile storage, and may provide those sampled values to another computing platform (e.g., the other of the graphical display device or host computing device) during runtime.

For the color-specific subpixel, at 218, the method includes combining two or more initially sampled values of the time-series of sampled values 214 to obtain accumulated value 220 for the color-specific subpixel. As a first example, combining the two or more sampled values at 218 may include summing the magnitudes of the two or more sampled values to obtain accumulated value 220. As a second example, combining the two or more sampled values at 218 may include averaging the two or more sampled values to obtain accumulated value 220. As a third example, combining the two or more sampled values at 218 may include determining accumulated value 220 as an integral of a function described by a magnitude of the sampled values and their respective time of sampling within the time-series of sampled values. Still other suitable combinations of sampled values may be used to obtain an accumulated value.

Some subpixel technologies or configurations may experience wear that exhibits a non-linear relationship to power input. Accordingly, each sampled value may be scaled according to an accumulation scaling function to obtain a linearized form of the sampled value prior to being combined with other sampled values at 218. The accumulation scaling function may be predefined and may reside in computer-readable storage, or may be provided to the computing platform from a remote source based on an identity of the graphical display device. Furthermore, the accumulation scaling function may be color-dependent such that each wavelength or wavelength range of color-specific subpixels has a color-specific accumulation scaling function. For example, in a pixel having red, green, and blue color-specific subpixels, three different color-specific accumulation scaling functions may be applied.

At 222, the method includes storing accumulated value 220 in computer-readable storage, which may take the form of non-volatile storage or volatile storage of the graphical display device, a host computing device connected to the graphical display device, or a remote computing device connected to the graphical display device or host computing device via a communications network. Volatile storage may be used, for example, within implementations where a computing platform of the graphical display device or a host computing device retains the accumulated during runtime. By contrast, non-volatile storage may be used to persistently retain the accumulated value, even across multiple sessions involving start-up and shutdown of the computing platform, for example. In at least some implementations, a computing platform (e.g., of the graphical display device or host computing device) may store the accumulated value in non-volatile storage, and may provide the accumulated value to another computing platform (e.g., the other of the graphical display device or host computing device) during runtime.

The method at 218 may further include updating accumulated value 220 by combining one or more subsequently sampled values of the time-series of sampled values 214 with the accumulated value representing the combination of two or more initially sampled values of the time-series of sampled values 214. For example, accumulated value 220 stored at 222 may be updated to reflect the combination of at least one subsequently sampled value with the two or more initially sampled values. The combination of one or more subsequently sampled values with accumulation value 220 may include the previously described summation, average, or integral, for example. The accumulation scaling function, if applied to the initially sampled values, may be similarly applied to the subsequently sampled values prior to being combined with the accumulated value as previously described. This process may be repeated for each subsequently sampled value of the time-series of sampled values 214. As such, accumulated value 220 may represent a history of use of the color-specific subpixel over the entire operational time of the graphical display device.

In at least some implementations, accumulated value 222 may be associated with one or more metadata values that identifies a time range (e.g., time counter) and/or a quantity of the sampled values (e.g., sample counter) that were previously combined to obtain the accumulated value 220. These metadata values may be used to consistently combine subsequently sampled values with previously combined sampled values of the accumulated value. For example, a metadata value that indicates a time range and/or quantity of previously combined sampled values may be used at 218 to weight the contribution of a subsequently sampled value to the updated accumulated value. The time range indicated by the metadata value may correspond to the entire operational time of the graphical display device (e.g., time counter) or may correspond to a time range (e.g., sampling rate) of each individual sampled value, depending on implementation.

At 224, the method includes deriving compensation data for the color-specific subpixel from the time-series of sampled values 214. Compensation data for a color-specific subpixel may include or otherwise refer to a correction value for the color-specific subpixel that may be used to augment the power input to the color-specific subpixel during operation to correct for wear. The correction value is described in further detail with reference to FIG. 3, and may be referred to as the subpixel multiplication memory (SPMM) value. Compensation data for a color-specific subpixel may further include or otherwise refer to a correction factor that is dependent upon the correction value. The correction factor is also described in further detail with reference to FIG. 3, and may be referred to as the subpixel memory equivalent (SPMEQ) value.

For each color-specific subpixel of the first subset, compensation data may be derived from the time-series of sampled values based on a first subpixel wear model. For other subsets of color-specific subpixels, compensation data may be derived from a time-series of sampled values based on a second subpixel wear model that differs from the first subpixel wear model. For example, the first subset may correspond to color-specific subpixels of a first color, and the second subset may correspond to color-specific subpixels of a second color that exhibits subpixel wear at a different rate than the first color. Here, the first subpixel wear model may define a first relationship between a magnitude of an accumulated value of the time-series of sampled values for color-specific subpixels of the first subset and the compensation data to be derived from the time-series of sampled values for the color-specific subpixels of the first subset. Similarly, the second subpixel wear model may define a second relationship, that differs from the first relationship, between a magnitude of an accumulated value of the time-series of sampled values for color-specific subpixels of the second subset and the compensation data to be derived from the time-series of sampled values for the color-specific subpixels of the second subset. A different subpixel wear model may be used for each color of subpixels supported by the graphical display device.

For example, at 226, the method includes deriving a correction value 228 for the color-specific subpixel from accumulated value 220. Correction value 228 represents a magnitude of correction that is to be applied to the color-specific pixel to compensate for wear. As accumulated value 220 increases over time due to use of the color-specific subpixel, correction value 228 may also increase to reflect the need for greater compensation to be applied to the color-specific subpixel.

In at least some implementations, a correction scaling function may define a relationship between accumulated value 220 and correction value 228. Here, the correction scaling function is a non-limiting example of a subpixel wear model discussed above. The correction scaling function may be predefined and may reside in computer-readable storage, or may be provided to the computing platform from a remote source based on an identity of the graphical display device. Furthermore, the correction scaling function may be color-dependent in which each wavelength or wavelength range of color-specific subpixel of the graphical display device has a corresponding correction scaling function for that wavelength or wavelength range. For example, in a pixel having red, green, and blue color-specific subpixels, three different color-specific correction scaling functions may be applied to accumulated values obtained for the red, green, and blue color-specific subpixels.

As previously described, correction value 228 may be based on accumulated value 220 for the color-specific subpixel, and may be further based on a rebalancing input 232 representing accumulated values or correction values of other color-specific subpixels of the same subset of color-specific pixels. Within this context, rebalancing among some or all of the color-specific subpixels of the subset may be performed to obtain a rebalanced correction value 228 for the color-specific subpixel. As an example, the subset may correspond to some or all of the color-specific subpixels of the graphical display device of a particular wavelength or wavelength range (e.g., red subpixels).

Continuing with this example, correction value 228 may be rebalanced among other correction values for other color-specific subpixels of the subset to maximize a total quantity of color-specific subpixels having a rebalanced correction value that corresponds to a target compensation value (e.g., unity or uncompensated) among the subset of color-specific subpixels. This rebalancing approach may limit the extent to which saturation is used to compensate for wear of color-specific subpixels.

For example, the compensation data (e.g., rebalanced compensation value) may be applied to an input display value to provide signal gain or signal attenuation to the input display value to obtain a compensated display signal. Here, rebalancing the signal gain or signal attenuation provided to the input display value may be used to increase or maximize a quantity of color-specific subpixels of the subset that have a target compensation value that does not introduce signal gain or signal attenuation.

At 230, the method includes storing correction value 228 in computer-readable storage, which may take the form of non-volatile storage or volatile storage of the graphical display device, a host computing device connected to the graphical display device, or a remote computing device connected to the graphical display device or host computing device via a communications network. Volatile storage may be used, for example, within implementations where a computing platform of the graphical display device or a host computing device retains the compensation value during runtime. By contrast, non-volatile storage may be used to persistently retain the compensation value, even across multiple sessions involving start-up and shutdown of the computing platform, for example. In at least some implementations, a computing platform (e.g., of the graphical display device or host computing device) may store the compensation value in non-volatile storage, and may provide the compensation value to another computing platform (e.g., the other of the graphical display device or host computing device) during runtime. Depending on implementation, compensation value 228 stored at 230 may include the rebalanced compensation value or an initial compensation value that is not rebalanced relative to other color-specific subpixels of the subset.

At 234, the method includes driving the color-specific subpixel based on the compensation data for the color-specific subpixel. As previously described, the compensation data may include correction value 228, in either rebalanced or initial form. In at least some implementations, a subpixel scaling function 236 executed by a computing system receives an uncompensated input display value 238 for the color-specific subpixel and correction value 228 for the color-specific subpixel. The subpixel scaling function 236 applies correction value 228, as a correction factor, to uncompensated input display value 238 to obtain a compensated display value 240.

In an example, an input display value is generated for each color-specific subpixel of the subset of color-specific subpixels (as well as all other subpixels of the display region) by a host computing device connected to the graphical display device. For each color-specific subpixel of the subset, the input display value is generated by the host computing device, the compensation data is applied to the input display value to obtain a compensated display value, and the color-specific subpixel is driven (e.g., by a power input) with a compensated display signal that is based on the compensated display value.

Accordingly, the color-specific subpixel is driven responsive to compensated display value 240 to provide a driven color-specific subpixel, as indicated at 242. Here, driving the color-specific subpixel based on the compensation data may include driving the color-specific subpixel with a compensated display signal that is based on the compensated display value. For example, compensated display value 240 may take the form of a control signal that defines power input to be applied to the color-specific subpixel by way of the compensated display signal. Accordingly, differences between compensated display value 240 and uncompensated input display value 238 correspond to differences in power input to the color-specific subpixel, which in turn defines a level of luminance produced by that color-specific subpixel.

Correction value 228 may be mapped to a corresponding correction factor to be applied to uncompensated input display value 238 by subpixel scaling function 236. As an example, subpixel scaling function 236 may access a look-up table, map, or other suitable relationship that defines a mapping between a range of available correction values and a range of available correction factors. The relationship between correction value and correction factor may be predefined and may reside in local computer-readable storage, or may be provided to the computing platform from a remote source based on an identity of the graphical display device. Furthermore, this relationship may be color-dependent in which each wavelength or wavelength range of color-specific subpixel of the graphical display device has a corresponding relationship between correction value and factor for that wavelength or wavelength range. For example, in a pixel having red, green, and blue color-specific subpixels, three different relationships may be defined between correction value and correction factor for the red, green, and blue color-specific subpixels. The subpixel scaling function will be described in further detail with reference to FIG. 3.

Figure 3:
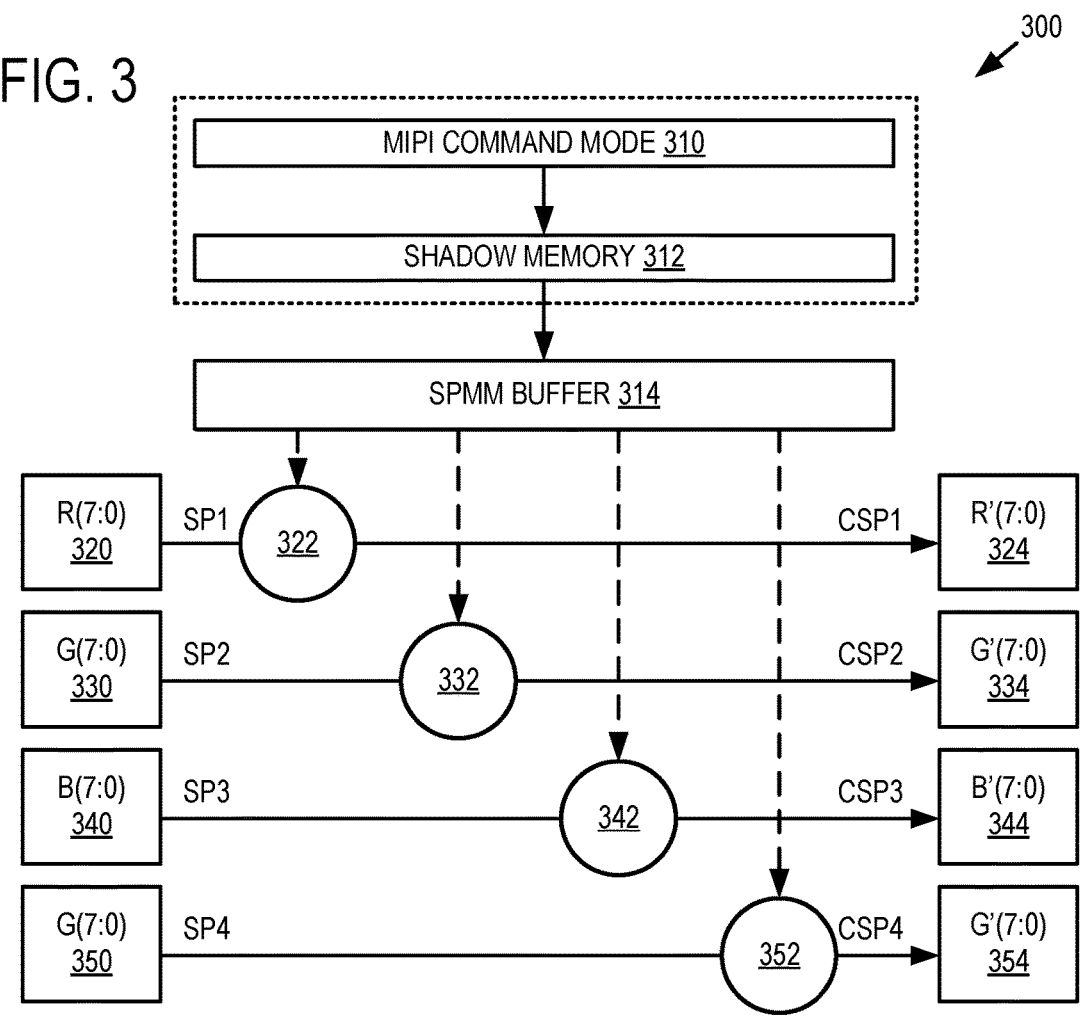
FIG. 3 is a schematic diagram depicting additional aspects of compensating for subpixel wear in a graphical display device.

FIG. 3 is a schematic diagram depicting additional aspects of compensating for subpixel wear in a graphical display device. The aspects depicted in FIG. 3 may be incorporated into method 200 and/or may be implemented apart from method 200. For example, the subpixel scaling functions described with reference to FIG. 3 are non-limiting examples of subpixel scaling function 236 of FIG. 2.

Within FIG. 3, a hardware machine of a computing platform of the graphical display device is capable of providing per sub-pixel wear compensation at pixel clock rate. The computing platform of the graphical display device includes a correction memory structure referred to as subpixel multiplication memory (SPMM). In FIG. 3, the SPMM takes the form of an SPMM buffer 314, as a non-limiting example.

The SPMM can be written to and read from using a common command interface 310, such as MIPI, DisplayPort, or HDMI, as non-limiting examples. A new MIPI, DisplayPort, or HDMI command may be defined to enable for updates of the SPMM. Alternatively, the SPMM could be updated using a virtual channel. Alternatively the SPMM could be updated using a dedicated interfaces such as parallel, I2C, SPI, etc. Values written to the SPMM may be referred to as SPMM values that correspond to the previously described correction values of method 200 of FIG. 2.

In at least some implementations, the SPMM is architecturally similar to the frame memory used in a full frame buffer or partial frame buffer of a timing controller. The SPMM provides per-subpixel correction values to a subpixel scaling function in the display controller data path to apply a correction factor to each sub-pixel. The correction values written to the SPMM may be calculated outside of the timing controller at a relatively slow rate by a sampling algorithm implemented by a computing platform located off-board the graphical display device to accumulate wear statistics per pixel (e.g., the accumulated value). For example, an algorithm implemented at a host computing device may be used to calculate a correction value per sub-pixel based on wear models determined per model of graphical display device. Alternatively, a timing controller processing or hardware machine may be used to calculate the correction values to be stored in the SPMM.

However, since subpixel wear is a relatively slow moving process, the host computing device is able to slowly update the SPMM, as new correction values are calculated. These new correction values may be queued, while the display is active in a smaller shadow memory structure 312. The new correction values may be committed to the correction memory structure SPMM from the shadow memory structure during the display non-active time (e.g., blanking). However, in some implementations, the SPMM values are loaded into the SPMM buffer during startup or booting of the host computing device. Accordingly, elements 310 and 312 of FIG. 3 may be omitted in at least some implementations. Alternatively, the correction values to be written to the SPMM may be calculated outside of the host computing device, in a cloud-based network-connected computing platform of a remote computing device, thereby enabling a lower cost host and/or reduction in calculations performed at the host.

A state machine or processing function referred to as the subpixel scaling function implemented by a computing platform of the graphical display device may coordinate the fetching of SPMM values from the subpixel multiplication memory. The subpixel scaling function previously described with reference to element 236 of FIG. 2 is depicted in multiple instances in FIGS. 3 at 322, 332, 342, and 352.

Each instance of the subpixel scaling function receives input values in the form of a subpixel value (SP1, SP2, SP3, SP4, etc.), also referred to as an uncompensated display value in the method of FIG. 2, and an SPMM value for that color-specific subpixel, and outputs a corrected subpixel value (CSP1, CSP2, CSP3, CSP4, etc.), also referred to as a compensated display value in the method of FIG. 2. Within FIG. 3, uncompensated subpixels are represented schematically at 320, 330, 340, and 350, and their compensated subpixel equivalents are represented schematically at 324, 334, 344, and 354.

The architecture of the SPMM may be partitioned to support one, two, or more pixel pipelines depending on the internal architecture of the timing controller. The subpixel scaling function may implement a saturation multiplication function that receives an N-bit pixel as one operand and an M-bit multiplication function as the second operand from the SPMM. The size of N may be determined by system requirements, but may, for example, be in the range of 6, 8, 10 or more bits. The correction value applied at the subpixel level corresponds to the M-bit value which can be less than the number of bits (N) used to encode the value of the sub-pixel. The size of M may be chosen to simultaneously satisfy the performance requirements of the system, wear characteristic of the pixels, and lifetime requirement for the graphical display device.

The behavior of the subpixel scaling function may be represented mathematically by the following expression: CSP=SP X SPMEQ, wherein X is saturating multiplication, CSP refers to compensated subpixel, SP refers to subpixel value, and SPMEQ refers to subpixel multiplication equivalent which is also referred to as the correction factor.

A non-limiting example mapping of SPMM to SPMEQ, using M=8, includes: 0x00=0.5000, 0x7F=1.0000, 0x80=1.0078 (saturating), 0xFF=2.0000 (saturating). As another non-limiting example mapping of SPMM to SPMEQ, using M=8, includes: 0x00=0.2500, 0x4F=1.0000, 0x50=1.0078 (saturating), 0x7F=2.0000 (saturating), 0xFF=4.0000 (saturating). As another non-limiting example mapping of SPMM to SPMEQ, using M=2, includes: 2'b00=0.5, 2'b01=1.0, 2'b10=1.5 (saturating), 2'b11=2.0 (saturating). In each of the above examples, 1.0 represents unity or an uncompensated display signal. It will be understood that these above non-limiting examples are provided for illustrative purposes, and that other mappings may be used depending on implementation and the overall granularity of compensation factors.

In view of the above, if M is set to equal a value of 0.0 and SPMEQ is set to equal a value of 1.0, compensation would not be applied to the subpixel. The number of bits used to represent the characteristic and the mantissa of the SPMEQ may be configured during design of the graphical display device to optimally meet the requirements of the system. In at least some implementations, the SPMM to SPMEQ mapping may be fixed in hardware to provide a cost efficient implementation. Alternatively, a look up table or other suitable predetermined relationship may be used, which allows the mapping of SPMM to SPMEQ to be dynamically or statically configured. The look up table, for example, could explicitly define every possible SPMM to SPMEQ mapping. The look up table could also be a sparse mapping where not every value is explicitly defined. Intermediate values not found in the table could be generated by interpolation.

Figure 4:
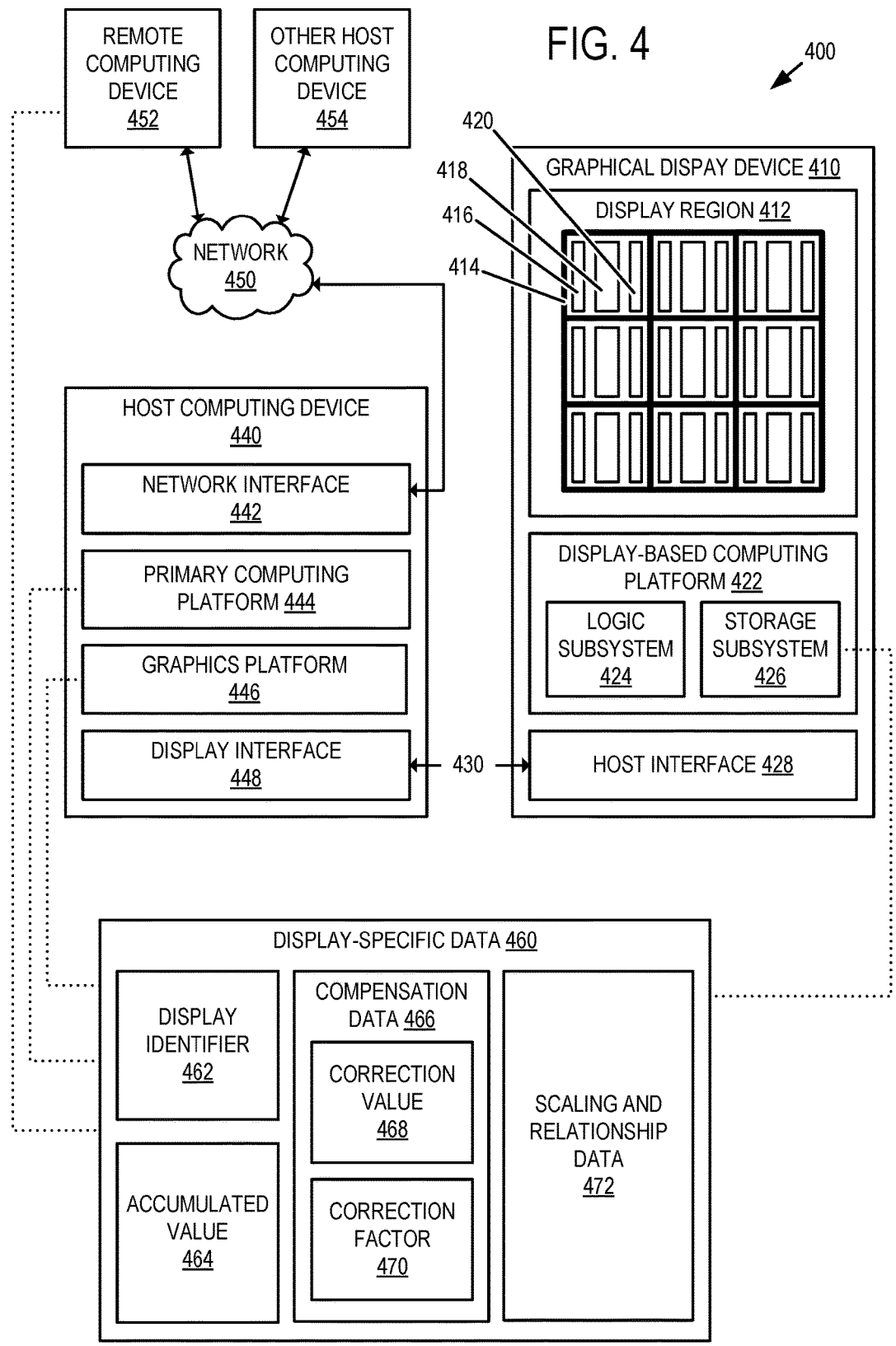
FIG. 4 is a schematic diagram depicting an example computing system that includes a graphical display device and a host computing device, among other system components.

FIG. 4 is a schematic diagram depicting a non-limiting example of a computing system 400. Computing system 400 includes a graphical display device 410 having a plurality of color-specific subpixels spatially distributed across a display region 412 of the graphical display device. Graphical display device 410 is a non-limiting example of previously described graphical display device 100 of FIG. 1.

In this example, display region 412 includes an array of pixels in which each pixel includes two or more color-specific subpixels. Example pixel 414, which includes three color-specific subpixels 416, 418, and 420, is representative of each pixel of display region 412. Color-specific subpixels 416, 418, and 420 correspond to different wavelength or wavelength ranges in this example. Accordingly, pixel 414 has three different color-specific subpixels in this example. Furthermore, in this example, color-specific subpixel 418 has a different configuration than color-specific subpixels 416 and 420. For example, color-specific subpixel 418 may be larger and/or may have a different shape than color-specific subpixels 416 and 420. Furthermore, in some implementations, a pixel may include two or more color-specific subpixels of the same wavelength or wavelength range.

Graphical display device 410 further includes a display-based computing platform 422 having a logic machine 424 and a data storage machine 426. As an example, logic machine 424 and data storage machine 426 may collectively implement the previously described subpixel scaling function 236 of FIG. 2. Logic machine 424 and data storage machine 426 may collectively implement or take the form of a timing controller and/or a display controller of the graphical display device as will be described in further detail with reference to FIG. 3. Aspects of logic machine 424 and data storage machine 426 will be described in further detail with reference to FIG. 5.

Graphical display device 410 further includes a host interface 428 to interface with a host device. Host interface 428 may support communication of electrical power, electrical ground, and/or data over a communications link 430 with a host computing device. Computing system 400 further includes an example of a host computing device 432 interfacing with graphical display device 410 as indicated schematically by communications link 430. Graphical display device 410 may be physically integrated with host computing device 432 in a common enclosure (e.g., a smart phone or tablet form-factor). Alternatively, graphical display device 410 may be a peripheral display device physically separated from host computing device 432, such that each device may have a separate enclosure.

Communications link 430 may take the form of one or more physical links (e.g., wires, electrical traces, or fiber optics) and/or one or more wireless communications links. Communications link 430 may represent one or more data pathways, one or more electrical power pathways, one or more electrical ground pathways, etc. Communications link 430 may utilize any suitable protocol or set of protocols to facilitate the exchange of data, electrical power, and/or electrical ground over communications link 430. Communications link 430 may be implemented on host computing device 432 via a display interface 434 and on graphical display device 410 via host interface 428.

In some implementations, display interface 434 and host interface 428 may each include a physical electrical connector having one or more electrically conductive pins or contacts. Here, each physical electrical connector may establish communications link 430 by interfacing with each other, or optionally via an intermediate cable or set of cables having corresponding physical electrical connectors. Non-limiting examples of physical electrical connectors for peripheral graphical display devices include DisplayPort, Mini DisplayPort, HMDI, USB, etc. However, one or more physical electrical conductive links of communications link 430 may be hardwired or otherwise permanently integrated between graphical display device 410 and host computing device 432, such as within the context of a fully integrated system within a common enclosure.

Host computing device 432 includes a primary computing platform 434 that includes a logic machine and a data storage machine. Host computing device 432 may further include a graphics platform 436, which refers to a special-purpose computing platform of the host computing device that may be used within the context of graphics processing. For example, graphics platform 436 may take the form of a graphics processing unit (GPU). Graphics platform 436 may include a logic machine and a data storage machine, as will be described in further detail with reference to FIG. 5.

Host computing device 432 may further include a network interface 438 by which the host computing device communicates with other computing devices via a communications network 440. For example, host computing device 432 may communicate with remote computing device 442 to provide or obtain display specific data 460 from off-board the host computing device.

Display specific data 460 may include or may be associated with a display identifier 462 that identifies graphical display device 410 within a domain of graphical display devices. Display identifier 462 may refer to a hardware identifier or a firmware identifier of graphical display device 410. Display identifier 462 may be communicated by graphical display device 410 to host computing device 440, and may be used by host computing device 440 to retrieve other forms of display-specific data 460 from remote sources or provide other forms of display-specific data 460 to remote sources, such as remote computing device 452. Likewise, other host computing devices (e.g., 454) may use display identifier 462 to retrieve or provide other forms of display-specific data 460 for graphical display device 410, thereby enabling measurements of subpixel wear to be tracked and maintained across multiple host computing devices.

Display-specific data 460 may further include an accumulated value 464 for each subpixel of the graphical display, which is a non-limiting example of previously described accumulated value 220 of FIG. 2. Display-specific data 460 may further include compensation data 466 for each subpixel of the graphical display, including a correction value 468 and/or a correction factor 470 for each subpixel of the graphical display. Correction value 468 a non-limiting example of previously described correction value 228 of FIG. 2. Display-specific data 460 may further include scaling and relationship data 472, which may include the previously described accumulation scaling function, correction scaling function, and correction value (e.g., SPMM value) to correction factor (e.g., SPMEQ value) mapping of method 200 of FIG. 2.

The broken lines within FIG. 4 depict numerous non-limiting examples of where display-specific data 460 may be stored. In at least some implementations, the accumulated value and/or the compensation data for each subpixel of the graphical display device may be stored in non-volatile storage of the host computing device connected to the graphical display device. Additionally or alternatively, the accumulated value and/or the compensation data for each subpixel of the graphical display device may be stored in non-volatile storage of the graphical display device. Additionally or alternatively, the accumulated value and/or compensation data for each subpixel of the graphical display device may be stored in the non-volatile storage of a remote computing device connected to the host computing device via a network.

In a non-limiting example of a distributed implementation, the display signals driving the color-specific subpixels are sampled by the host computing device to obtain a time-series of sampled values, and the compensation data is derived from the time-series of sampled values by the host computing device for each color-specific subpixel of a subset (or of the entire graphical display device). For each color-specific subpixel of the subset, the compensation data is transmitted from the host computing device to the graphical display device, the compensation data is received at the graphical display device, and the compensation data is applied at the graphical display device to an input display value received from the host computing device to obtain a compensated display value. The graphical display device drives the color-specific subpixels based on the compensation data for each subpixel with a compensated display signal for that subpixel that is based on the compensated display value. However, in a localized implementation, the above processes may be performed on-board the graphical display device with the exception of input display signals being generated by the host computing device.

In at least some implementations, the methods and processes described herein may be tied to a computing system of one or more computing devices. In particular, such methods and processes may be implemented as a computer-application program or service, an application-programming interface (API), a library, and/or other computer-program product.

Figure 5:
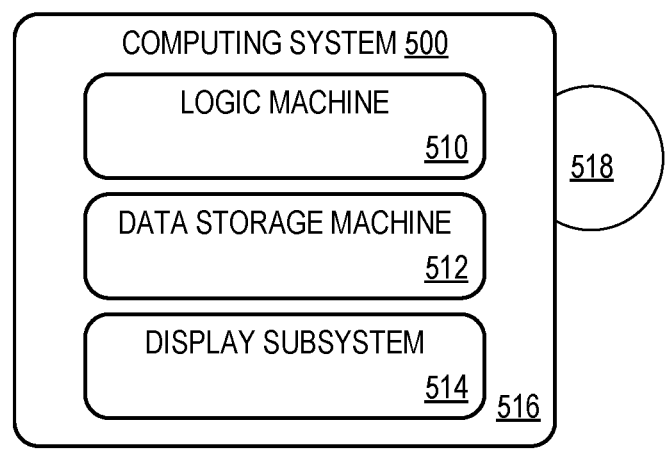
FIG. 5 is a schematic diagram depicting an example computing system.

FIG. 5 schematically shows a non-limiting example of a computing system 500 that can enact one or more of the methods and processes described above. For example, computing system 500 may be representative of computing system 400 of FIG. 4, or the various computing devices and/or computing platforms thereof, including host computing device 440, remote computing device 452, other host computing device 454, and host computing device 440 in combination with graphical display device 410. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 510 and a data storage machine 512. Computing system 500 may optionally include a display subsystem 514 (e.g., an integrated or peripheral graphical display device), an input subsystem, a communication subsystem, and/or other components not shown in FIG. 5.

Logic machine 510 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 512 includes one or more physical devices configured to hold instructions executable by the logic machine to implement the methods and processes described herein. When such methods and processes are implemented, the state of storage machine 512 may be transformed—e.g., to hold different data.

Storage machine 512 may include removable and/or built-in devices. Storage machine 512 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 512 may include volatile, nonvolatile, dynamic, static, read/write, read-only, random-access, sequential-access, location-addressable, file-addressable, and/or content-addressable devices.

It will be appreciated that storage machine 512 includes one or more physical devices. However, aspects of the instructions described herein alternatively may be propagated by a communication medium (e.g., an electromagnetic signal, an optical signal, etc.) that is not held by a physical device for a finite duration. Furthermore, aspects of instructions described herein may reside on removable media devices, such as represented schematically at 518.

Logic machine 510 and storage machine 512 may be collectively referred to as a computing platform. Aspects of logic machine 510 and storage machine 512 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 510 executing instructions held by storage machine 512. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices. As an example, a service may provide display-specific data to a client host computing device or client graphical display device in response to a request that contains an identifier of the graphical display device. As another example, a service may store display-specific data received from a client host computing device or client graphical display device in response to a request that contains an identifier of the graphical display device.

When included, display subsystem 514 may be used to present a visual representation of data held by storage machine 512. This visual representation may take the form of a graphical user interface (GUI). As the herein described methods and processes change the data held by the storage machine, and thus transform the state of the storage machine, the state of display subsystem 514 may likewise be transformed to visually represent changes in the underlying data. Display subsystem 514 may include one or more graphical display devices utilizing virtually any type of technology. Again, such display devices may be combined with logic machine 510 and/or storage machine 512 in a shared enclosure 516, or such display devices may be peripheral display devices.

When included, an input subsystem may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, a communication subsystem may be configured to communicatively couple computing system 500 with one or more other computing devices. Communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

In an example, a method of compensating for subpixel wear in a graphical display device having a plurality of color-specific subpixels spatially distributed across a display region of the graphical display device comprises, for each color-specific subpixel of a subset of the plurality of color-specific subpixels: sampling one or more display signals directed to the color-specific subpixel to obtain a time-series of sampled values; storing, in non-volatile storage, compensation data for the color-specific subpixel derived from the time-series of sampled values; and driving the color-specific subpixel based on the compensation data. In this example or any other example, the method further comprises, for each color-specific subpixel of the subset: combining two or more initially sampled values of the time-series of sampled values to obtain an accumulated value for the color-specific subpixel; and deriving the compensation data for the color-specific subpixel from the accumulated value. In this example or any other example, the method further comprises: storing the accumulated value in non-volatile storage; and updating the accumulated value stored in non-volatile storage by combining one or more subsequently sampled values of the time-series of sampled values with the two or more initially sampled values. In this example or any other example, the accumulated value is stored in the non-volatile storage of a host computing device connected to the graphical display device. In this example or any other example, the compensation data is stored in the non-volatile storage of the graphical display device. In this example or any other example, the compensation data is stored in the non-volatile storage of a host computing device connected to the graphical display device. In this example or any other example, the compensation data is stored in the non-volatile storage of a remote computing device connected to a host computing device via a network. In this example or any other example, an input display value is generated for each color-specific subpixel of the subset by a host computing device connected to the graphical display device. In this example or any other example, the method further comprises, for each color-specific subpixel of the subset: receiving the input display value generated by the host computing device; applying the compensation data to the input display value to obtain a compensated display value; wherein driving the color-specific subpixel based on the compensation data includes driving the color-specific subpixel with a compensated display signal based on the compensated display value. In this example or any other example, applying the compensation data to the input display value includes providing signal gain or signal attenuation to the input display value to obtain the compensated display signal. In this example or any other example, the method further comprises rebalancing the signal gain or signal attenuation provided to the input display value to increase or maximize a quantity of color-specific subpixels of the subset that have a target compensation value that does not introduce signal gain or signal attenuation. In this example or any other example, the one or more display signals are sampled by a host computing device, and the compensation data is derived from the time-series of sampled values by the host computing device for each color-specific subpixel of the subset. In this example or any other example, the method further comprises, for each color-specific subpixel of the subset: receiving, from the host computing device, the compensation data at the graphical display device, applying the compensation data at the graphical display device to an input display value received from the host computing device to obtain a compensated display value, and wherein driving the color-specific subpixel based on the compensation data includes driving the color-specific subpixel with a compensated display signal that is based on the compensated display value. In this example or any other example, the subset of the plurality of color-specific subpixels includes a first subset of color-specific subpixels corresponding to a first wavelength or wavelength range; and the plurality of color-specific subpixels further includes a second subset of color-specific subpixels corresponding to a second wavelength or wavelength range that differs from the first subset. In this example or any other example, the method further comprises, for each color-specific subpixel of the first subset: deriving the compensation data from the time-series of sampled values based on a first subpixel wear model; and for each color-specific subpixel of the second subset: deriving the compensation data from the time-series of sampled values based on a second subpixel wear model that differs from the first subpixel wear model. In this example or any other example, first subpixel wear model defines a first relationship between a magnitude of an accumulated value of the time-series of sampled values for color-specific subpixels of the first subset and the compensation data to be derived from the time-series of sampled values for the color-specific subpixels of the first subset; and the second subpixel wear model defines a second relationship, that differs from the first relationship, between a magnitude of an accumulated value of the time-series of sampled values for color-specific subpixels of the second subset and the compensation data to be derived from the time-series of sampled values for the color-specific subpixels of the second subset. In this example or any other example, the subset of the plurality of color-specific subpixels further includes a third subset of color-specific subpixels corresponding to a third wavelength or wavelength range that differs from the first subset and the second subset. In this example or any other example, the first, second, and third wavelength or wavelength ranges are selected from a group comprising red, green, blue, white, infrared.

In an example, a computing system comprises: a graphical display device including: a display region having a plurality of color-specific subpixels spatially distributed across the display region; a data storage machine including a buffer; and a logic machine programmed with instructions to: for each color-specific subpixel of a subset of the plurality of color-specific subpixels: receive compensation data from a host computing device connected to the graphical display device via a communications link, the compensation data being derived from a time-series of sampled values obtained from previously sampled display signals directed to that color-specific subpixel, store the compensation data in the buffer, receive, via the communications link, an input display value generated by the host computing device, apply the compensation data to the input display signal to obtain a compensated display value; and drive the color-specific subpixel with a compensated display signal based on the compensated display value. In this example or any other example, the computing further comprises: the host computing device, including: non-volatile storage; and a graphics processing unit programmed to: for each color-specific subpixel of the subset: sample display signals driving the color-specific subpixel of the graphical display device to obtain a time-series of sampled values; combine the time-series of sampled values to obtain an accumulated value; store the accumulated value in the non-volatile storage; derive the compensation data from the accumulated value; and transmit the compensation data to the graphical display device. In this example or any other example, the subset of the color-specific subpixels includes a first subset of color-specific subpixels corresponding to a first wavelength or wavelength range; wherein the plurality of color-specific subpixels includes a second subset of color-specific subpixels corresponding to a second wavelength or wavelength range that differs from the first subset. In this example or any other example, the logic machine is further programmed with instructions to: for each color-specific subpixel of the second subset: receive second compensation data from the host computing device, the second compensation data for each color-specific subpixel of the second subset being derived from a time-series of sampled values obtained from one or more previously sampled display signals driving the color-specific subpixel, store the second compensation data in the buffer, receive an input display value generated by the host computing device, apply the compensation data to the input display value to obtain a compensated display value; and drive the color-specific subpixel with a compensated display signal based on the compensated display value. In this example or any other example, the logic machine is further programmed with instructions to: for each color-specific subpixel of the subset, apply the compensation data to the input display value to obtain a compensated display value by rebalancing signal gain or signal attenuation provided to the input display value to increase or maximize a quantity of color-specific subpixels of the subset that have a target compensation value that does not introduce signal gain or signal attenuation.

In an example, a method of compensating for subpixel wear in a graphical display device having a plurality of color-specific subpixels spatially distributed across a display region of the graphical display device comprises: for each color-specific subpixel of a subset of the plurality of color-specific subpixels: sampling one or more display signals driving the color-specific subpixel to obtain a time-series of sampled values; combining the time-series of sampled values to obtain an accumulated value; storing, in non-volatile storage, the accumulated value; deriving a compensation data for the color-specific subpixel from the accumulated value; obtaining an input display value from a host computing device connected to the graphical display device; applying the compensation data to the input display value to obtain a compensated display value; and driving the color-specific subpixel with a compensated display signal that is based on the compensated display value; wherein the subset includes all color-specific subpixels of the display region having a defined wavelength or wavelength range that differs from another subset of color-specific subpixels of the display region.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of compensating for subpixel wear in a graphical display device having a plurality of color-specific subpixels spatially distributed across a display region of the graphical display device, the method comprising:
   for each color-specific subpixel of a subset of the plurality of color-specific subpixels in which an input display value is generated for each color-specific subpixel of the subset by a host computing device connected to the graphical display device:
      sampling one or more display signals directed to the color-specific subpixel to obtain a time-series of sampled values;
      storing, in non-volatile storage, compensation data for the color-specific subpixel derived from the time-series of sampled values;
      receiving the input display value generated by the host computing device:
      applying the compensation data to the input display value to obtain a compensated display value;
      driving the color-specific subpixel based on the compensation data, including driving the color-specific subpixel with a compensated display signal based on the compensated display value.

2. The method of claim 1, further comprising:
for each color-specific subpixel of the subset:
combining two or more initially sampled values of the time-series of sampled values to obtain an accumulated value for the color-specific subpixel; and
deriving the compensation data for the color-specific subpixel from the accumulated value.

3. The method of claim 2, further comprising:
storing the accumulated value in non-volatile storage; and
updating the accumulated value stored in non-volatile storage by combining one or more subsequently sampled values of the time-series of sampled values with the two or more initially sampled values.

4. The method of claim 3, wherein the accumulated value is stored in the non-volatile storage of the host computing device connected to the graphical display device.

5. The method of claim 1, wherein the compensation data is stored in the non-volatile storage of the graphical display device.

6. The method of claim 1, wherein the compensation data is stored in the non-volatile storage of the host computing device connected to the graphical display device.

7. The method of claim 1, wherein the compensation data is stored in the non-volatile storage of a remote computing device connected to the host computing device via a network.

8. The method of claim 1, wherein applying the compensation data to the input display value includes providing signal gain or signal attenuation to the input display value to obtain the compensated display signal; and
wherein the method further comprises:
rebalancing the signal gain or signal attenuation provided to the input display value to increase or maximize a quantity of color-specific subpixels of the subset that have a target compensation value that does not introduce signal gain or signal attenuation.

9. The method of claim 1, wherein the subset of the plurality of color-specific subpixels includes a first subset of color-specific subpixels corresponding to a first wavelength or wavelength range; and
wherein the plurality of color-specific subpixels further includes a second subset of color-specific subpixels corresponding to a second wavelength or wavelength range that differs from the first subset.

10. The method of claim 9, further comprising:
for each color-specific subpixel of the first subset, deriving the compensation data from the time-series of sampled values based on a first subpixel wear model; and
for each color-specific subpixel of the second subset, deriving the compensation data from the time-series of sampled values based on a second subpixel wear model that differs from the first subpixel wear model.

11. The method of claim 10, wherein the first subpixel wear model defines a first relationship between a magnitude of an accumulated value of the time-series of sampled values for color-specific subpixels of the first subset and the compensation data to be derived from the time-series of sampled values for the color-specific subpixels of the first subset; and
wherein the second subpixel wear model defines a second relationship, that differs from the first relationship, between a magnitude of an accumulated value of the time-series of sampled values for color-specific subpixels of the second subset and the compensation data to be derived from the time-series of sampled values for the color-specific subpixels of the second subset.

12. The method of claim 9, wherein the subset of the plurality of color-specific subpixels further includes a third subset of color-specific subpixels corresponding to a third wavelength or wavelength range that differs from the first subset and the second subset; and
wherein the first, second, and third wavelength or wavelength ranges are selected from a group comprising red, green, blue, white, infrared.

13. A method of compensating for subpixel wear in a graphical display device having a plurality of color-specific subpixels spatially distributed across a display region of the graphical display device, the method comprising:
for each color-specific subpixel of a subset of the plurality of color-specific subpixels:
sampling one or more display signals directed to the color-specific subpixel to obtain a time-series of sampled values;
storing, in non-volatile storage, compensation data for the color-specific subpixel derived from the time-series of sampled values;
driving the color-specific subpixel based on the compensation data;
wherein the one or more display signals are sampled by a host computing device, and the compensation data is derived from the time-series of sampled values by the host computing device for each color-specific subpixel of the subset; and
wherein the method further comprises, for each color-specific subpixel of the subset:
receiving, from the host computing device, the compensation data at the graphical display device,
applying the compensation data at the graphical display device to an input display value received from the host computing device to obtain a compensated display value, and
wherein driving the color-specific subpixel based on the compensation data includes driving the color-specific subpixel with a compensated display signal that is based on the compensated display value.

14. The method of claim 13, further comprising:
for each color-specific subpixel of the subset:
combining two or more initially sampled values of the time-series of sampled values to obtain an accumulated value for the color-specific subpixel; and
deriving the compensation data for the color-specific subpixel from the accumulated value.

15. The method of claim 14, further comprising:
storing the accumulated value in non-volatile storage; and
updating the accumulated value stored in non-volatile storage by combining one or more subsequently sampled values of the time-series of sampled values with the two or more initially sampled values.

16. The method of claim 13, wherein the subset of the plurality of color-specific subpixels includes a first subset of color-specific subpixels corresponding to a first wavelength or wavelength range;
wherein the plurality of color-specific subpixels further includes a second subset of color-specific subpixels corresponding to a second wavelength or wavelength range that differs from the first subset; and
wherein the method further comprises:
for each color-specific subpixel of the first subset, deriving the compensation data from the time-series of sampled values based on a first subpixel wear model; and
for each color-specific subpixel of the second subset, deriving the compensation data from the time-series of sampled values based on a second subpixel wear model that differs from the first subpixel wear model.

17. A computing system, comprising:
a graphical display device including:
  a display region having a plurality of color-specific subpixels spatially distributed across the display region;
  a data storage machine including a buffer; and
  a logic machine programmed with instructions to:
    for each color-specific subpixel of a subset of the plurality of color-specific subpixels:
      receive compensation data from a host computing device connected to the graphical display device via a communications link, the compensation data being derived from a time-series of sampled values obtained from previously sampled display signals directed to that color-specific subpixel,
      store the compensation data in the buffer,
      receive, via the communications link, an input display value generated by the host computing device,
      apply the compensation data to the input display signal to obtain a compensated display value, and
      drive the color-specific subpixel with a compensated display signal based on the compensated display value;
the host computing device, including:
  non-volatile storage; and
  a graphics processing unit programmed to:
    for each color-specific subpixel of the subset:
      sample display signals driving the color-specific subpixel of the graphical display device to obtain a time-series of sampled values,
      combine the time-series of sampled values to obtain an accumulated value,
      store the accumulated value in the non-volatile storage,
      derive the compensation data from the accumulated value, and
      transmit the compensation data to the graphical display device.

18. The computing system of claim 17, wherein the subset of the color-specific subpixels includes a first subset of color-specific subpixels corresponding to a first wavelength or wavelength range;
wherein the plurality of color-specific subpixels includes a second subset of color-specific subpixels corresponding to a second wavelength or wavelength range that differs from the first subset.

19. The computing system of claim 18, wherein the logic machine is further programmed with instructions to:
for each color-specific subpixel of the second subset:
  receive second compensation data from the host computing device, the second compensation data for each color-specific subpixel of the second subset being derived from a time-series of sampled values obtained from one or more previously sampled display signals driving the color-specific subpixel of the second subset,
  store the second compensation data in the buffer,
  receive a second input display value generated by the host computing device,
  apply the second compensation data to the second input display value to obtain a second compensated display value; and
  drive the color-specific subpixel of the second subset with a second compensated display signal based on the second compensated display value.

20. The computing system of claim 17, wherein the logic machine is further programmed with instructions to:
for each color-specific subpixel of the subset, apply the compensation data to the input display value to obtain a compensated display value by rebalancing signal gain or signal attenuation provided to the input display value to increase or maximize a quantity of color-specific subpixels of the subset that have a target compensation value that does not introduce signal gain or signal attenuation.

* * * * *